(No Model.)

H. R. JUNE.
MUD PAN.

No. 544,064. Patented Aug. 6, 1895.

WITNESSES;
Chas. W. Marvin.
Conic. Schornck.

INVENTOR
Henry R. June.

BY
Smith & Brison
ATTORNEYS.

UNITED STATES PATENT OFFICE.

HENRY R. JUNE, OF ELMIRA, NEW YORK.

MUD-PAN.

SPECIFICATION forming part of Letters Patent No. 544,064, dated August 6, 1895.

Application filed September 12, 1894. Serial No. 522,835. (No model.)

*To all whom it may concern:*

Be it known that I, HENRY R. JUNE, of Elmira, in the county of Chemung, in the State of New York, have invented new and useful Improvements in Mud-Pans, of which the following, taken in connection with the accompanying drawings, is a full, clear, and exact description.

This invention relates to mud-pans.

My object is to produce a mud-pan adapted to be placed in the bottom of boilers for the purpose of collecting the lime, dirt, and other foreign matter as it settles to the bottom, and adapting it to be readily relieved of such matter when desired; and to that end my invention consists in the several new and novel features and combination of parts hereinafter described, and which are specifically set forth in the claims hereunto annexed.

It is constructed as follows, reference being had to the accompanying drawings, in which—

Figure 1:
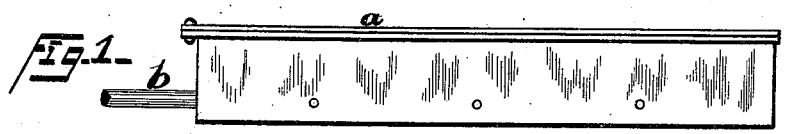
Figure 2:
Figure 3:
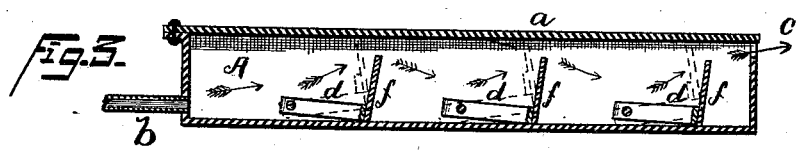
Figure 4:
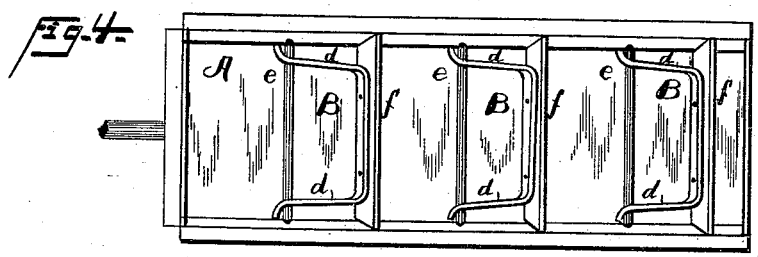
Figure 5:
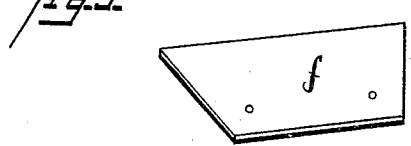
Figure 6:
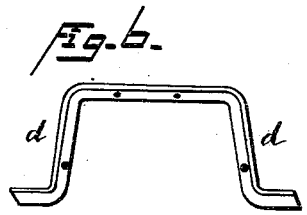

Figure 1 shows a side view of the pan complete ready for use. Fig. 2 shows a rear view thereof. Fig. 3 shows a longitudinal vertical section, showing the gates as they appear in use, and showing them in reverse position in dotted lines as they appear when the pan is being cleaned or the foreign matter removed therefrom. Fig. 4 is a top plan view of the pan-cover removed. Fig. 5 is a view of the wing of the gate detached. Fig. 6 is a view of the bracket upon which the wing of the gate is mounted.

Similar letters of reference indicate corresponding parts.

A is the pan constructed substantially as shown, but preferably narrower at the bottom than at the top, and provided with a cover $a$ and the inlet-pipe $b$ at one end at or near the bottom, and an opening $c$ at its diagonally-opposite end.

B are gates swingingly mounted transversely within the pan, $d$ being a bracket provided with means for swingingly mounting it upon the rods $e$.

$f$ are wings secured, substantially as shown, to the bracket $d$, so as to stand at an angle to the bottom of the pan when in use. Wings $f$ are preferably constructed smaller at their lower edge, so as to have their edges conform themselves to the sides of the pan, and at the same time be easily reversed when the pan is being cleaned.

The pan is operated as follows: The feed-water to the boiler passes into the pan through the inlet-pipe $b$. It then takes the course assumed by the arrow until it strikes the first wing of the gate, whence it passes upwardly and over the wing and down to the bottom of the pan until it reaches the next wing, and so on until it passes out through the opening $c$. By the time the water is ready to pass out of the opening $c$ the most of the sediment has deposited itself in the bottom of the pan, and when sufficient of the sediment has collected in the bottom of the pan, so as to be advisable to clean it, the feed-water is shut off from the inlet-pipe $b$ and the valve opened, and the pressure in the boiler then forces the gates over to the position shown in the dotted lines in Fig. 3, the steam and water forcing the sediment from the bottom of the pan out through the inlet-pipe.

Having described my invention, what I claim, and desire to secure by Letters Patent, is—

1. A mud pan having its sides converging as it approaches the bottom, having an inlet pipe at one end and an opening at its opposite end, a cover and gates swingingly mounted transversely within the pan, as set forth.

2. A mud pan having an inlet pipe at one end, an opening at its opposite end, gates mounted transversely therein, said gates comprising the bracket, means for swingingly mounting it and a wing secured thereto.

In witness whereof I have hereunto set my hand on this 6th day of September, 1894.

HENRY R. JUNE.

In presence of—
JOHN LARSON,
A. B. GALATIAN.